May 24, 1960 T. F. BOYD 2,938,124
PORTABLE BETA RADIATION THICKNESS GAGE
Filed June 14, 1956 2 Sheets-Sheet 1
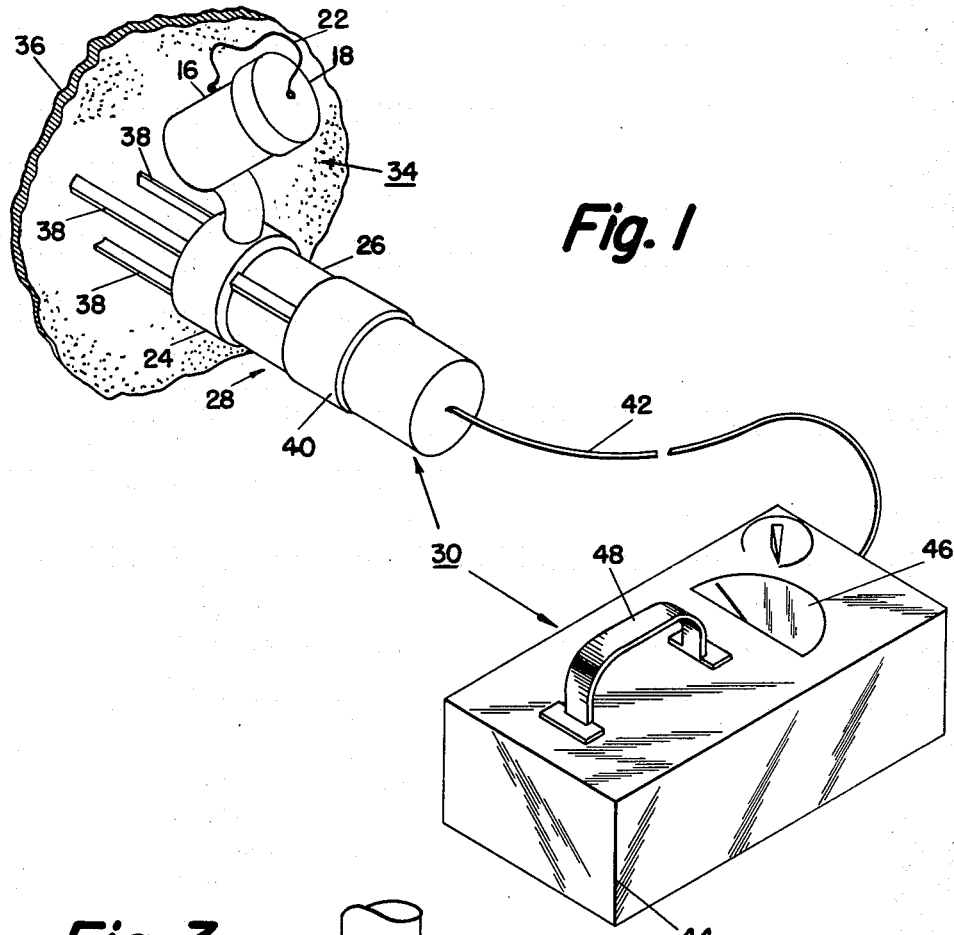
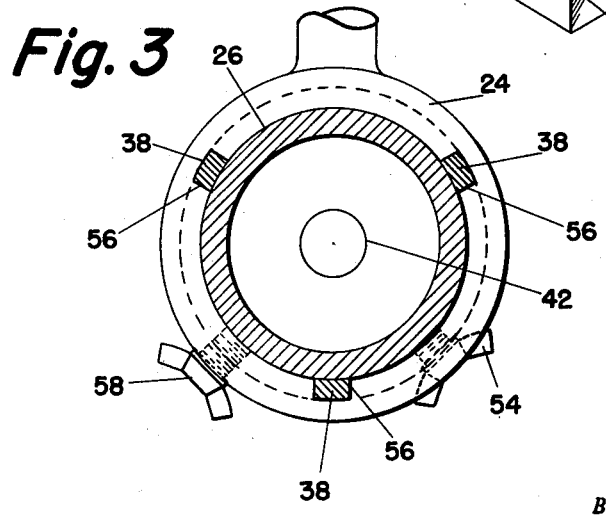
INVENTOR.
THOMAS F. BOYD
BY George Sipkin
Edward W. Hughes
ATTORNEYS May 24, 1960 T. F. BOYD 2,938,124
PORTABLE BETA RADIATION THICKNESS GAGE
Filed June 14, 1956 2 Sheets-Sheet 2

INVENTOR.
THOMAS F. BOYD
BY George Sipkin
Edward W Hughes
ATTORNEYS

United States Patent Office 2,938,124
Patented May 24, 1960

2,938,124

PORTABLE BETA RADIATION THICKNESS GAGE

Thomas F. Boyd, Philadelphia, Pa., assignor to the United States of America as represented by the Secretary of the Navy Filed June 14, 1956, Ser. No. 591,509

1 Claim. (Cl. 250—83.6)

(Granted under Title 35, U.S. Code (1952), sec. 266)

This invention may be manufactured and used by or for the Government of the United States without the payment of any compensation thereon or therefor.

This invention relates to devices for measuring non-destructively the thickness of the coating on a base material, and in particular to a portable beta radiation thickness gage.

The length of time a coating, such as paint, provides satisfactory protection to wear and corrosion depends, other things remaining constant, on the thickness of the coating. There is, however, an optimum thickness for each type of coating which provides the maximum protection for the minimum cost. If the thickness of the coating is less than optimum, then the coating will not provide the protection intended for a satisfactory period of time. If the thickness of the coating is greater than optimum, there is an increase in cost due to the materials used and the manpower in applying the coating with no commensurate increase in the amount of protection received.

The exterior surfaces of the ocean going vessel are subjected to severe use under conditions conclusive to corrosion. It is, therefore, very important that the correct thickness of the protective coatings of paint be applied. There has been no satisfactory method for readily measuring non-destructively the thickness of a coating of paint applied to a ship.

A similar problem, but one peculiar to Navy combatant vessels, arises because of the necessity of applying anti-fouling paint, which inhibits the growth of barnacles, to sonar domes. It is necessary that the anti-fouling paint be uniformly applied to the sonar domes and that the proper thickness of the paint be applied otherwise the performance of the sonar system will be adversely affected.

It is, therefore, an object of this invention to provide improved apparatus for the non-destructive measurement of the thickness of a coating on a base material.

It is a further object of this invention to provide portable apparatus for the non-destructive measurement of the thickness of a coating applied to a base.

It is a still further object of this invention to provide a portable beta radiation thickness gage for measuring the thickness of a coating applied to a base.

Other objects and advantages of the invention will hereinafter become more fully apparent from the following description of the annexed drawings, which illustrate a preferred embodiment, and wherein:

Fig. 1 is a perspective view of the thickness gage;

Fig. 3 is a section taken on the line 3—3 of Fig. 2; and

Figure 2:
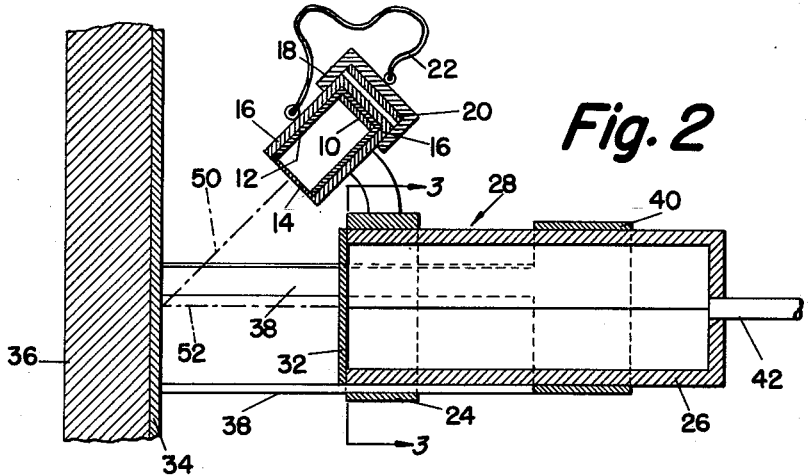
Fig. 2 is a lonigtudinal section through the radiation sensing means of the gage.

Beta radiation, which consists of high energy electrons, is reflected primarily by density discontinuities such as exist between an object and the atmosphere and between a coating and the base on which the coating is applied. The amount of radiation reflected from a density discontinuity occurrring at the boundary between a base material and its coating depends upon the atomic number of the coating, the atomic number of the base, the thickness of the coating, and the thickness of the base. If the composition of the base and coating is known, as well as the thickness of the base, it is possible to calibrate the amount of beta radiation from a given source reflected from the coated material in terms of the thickness of the coating assuming that the distance of the source and the radiation sensing device from the coating are constant and that the intensity and average value of the energy of the beta radiation remains constant with time. The reflection of the beta radiation takes place at the boundary between the coating and the atmosphere, within the coating material, at the boundary between the coating and the base, and within the base material. The thickness of the base material is important only if it is less than that which is the equivalent of an infinite thickness, the thickness at which any further increase in the thickness of the base will not increase the amount of radiation reflected, which thickness varies with the material used. In steel it is on the order of 1/8 to 1/4 of an inch.

Strontium 90-yttrium 90 have proven to be satisfactory sources of high energy beta radiation. The strontium 90-yttrium 90 are deposited as salts in a thin layer 10 in container 12. Outer wall 14 of container 12 is made very thin so as to serve as a window through which the beta radiation may freely pass. The other walls of container 12 are made sufficiently thick to prevent beta radiation from layer 10 from passing through them. Container 12 is preferably made of a material having a low atomic number, such as aluminum, because aluminum when bombarded by high speed electrons does not produce an appreciable amount of X-rays. Further, the X-rays that are produced are of relatively long wave lengths; and therefore, are easily absorbed.

Container 12 is located within a hollow open ended cylindrical shield 16. Shield 16 is made of a material having high atomic weight, such as lead, which will absorb such soft X-rays as may be produced by the bombardment of container 12 by the beta radiation. Shield 16 is provided with a cap 18 which can be fitted on either end of shield 16. The inner surface of cap 18 is formed by disk 20 made of the same material as container 12 and of sufficient thickness to absorb all beta radiation incident thereon. Cap 18 may be secured to shield 16 by a chain, or cord, 22 so that it will not become misplaced.

Shield 16 is secured to an adjusting ring 24 which is mounted on the housing 26 of a radiation sensing device 28. Radiation sensing device 28 may be a Geiger-Muller tube or an ionization chamber and is a component of the radiation detector 30. A thin window 32 made out of a material which has low attenuation for beta radiation, such as aluminum, mica, or quartz, is formed in one end of housing 28. In order to locate window 32 a fixed distance from the outer surface of the coating 34 of base 36, three legs 38 are secured to a second adjusting ring 40 which is mounted on housing 26 of radiation sensitive device 28.

Radiation sensing device 28 is connected by an insulated electric cord 42 to container 44 in which are located the battery powered power supply for radiation detector 30 and a meter 46 for measuring the magnitude of the current flow through the sensing device 28. Container 44 is provided with a handle 48 for ease in carrying the beta thickness gage, which weighs, in one embodiment, less than 10 pounds.

The opening within container 12 is made relatively long and narrow so that the beta radiation emanating from the strontium 90-yttrium 90 layer 10 is formed into a relatively narrow beam. The axis 50 of the beam of beta radiation is substantially coincident with the longitudinal axis of container 12 and shield 16. Shield 16 is in turn mounted by adjusting ring 24 so that the axis 50 of the beam of beta radiation will strike the outer surface of the coating 34 at approximately an angle of 45° when the window 32 of radiation sensing device 28 is parallel to the outer surface of coating 34. It has been found that the maximum amount of beta radiation is reflected into the radiation sensing device 28 when the point where axis 50 strikes the outer surface of coating 34 is substantially the same point where the longitudinal axis 52 of the sensing device 28 intersects the outer surface of coating 34.

Adjusting ring 40 can be moved relative to housing 26 to vary the distance window 32 is located from the outer surface of coating 34. When winged nut 54, see Fig. 3, is tightened, relative movement of adjusting ring 40 with respect to housing 26 is prevented. Adjusting ring 24 on which shield 16 is mounted is provided with three equiangularly spaced slots 56 through which extend the legs 38. This arrangement prevents the beam of beta radiation emanating from the thin layer 10 of strontium 90-yttrium 90 from striking any of the legs 38 before the radiation strikes coating 34. Whenever the shield 16 is in the proper position with respect to housing 26, it may be fixed in this position by tightening of winged nut 58. By having both rings 40 and 24 adjustable with respect to housing 26 it is possible to vary the distance between the window 32 of the radiation sensing device 28 and the outer surface of the coating 34 and still have the center of the beam of beta radiation 50 intersect the surface of the coating 34 at the point where the longitudinal axis 52 of the sensing device 28 strikes the outer surface of coating 34. This also permits the gage to be used to measure the thickness of coatings on surfaces other than those that are flat.

Figure 4:
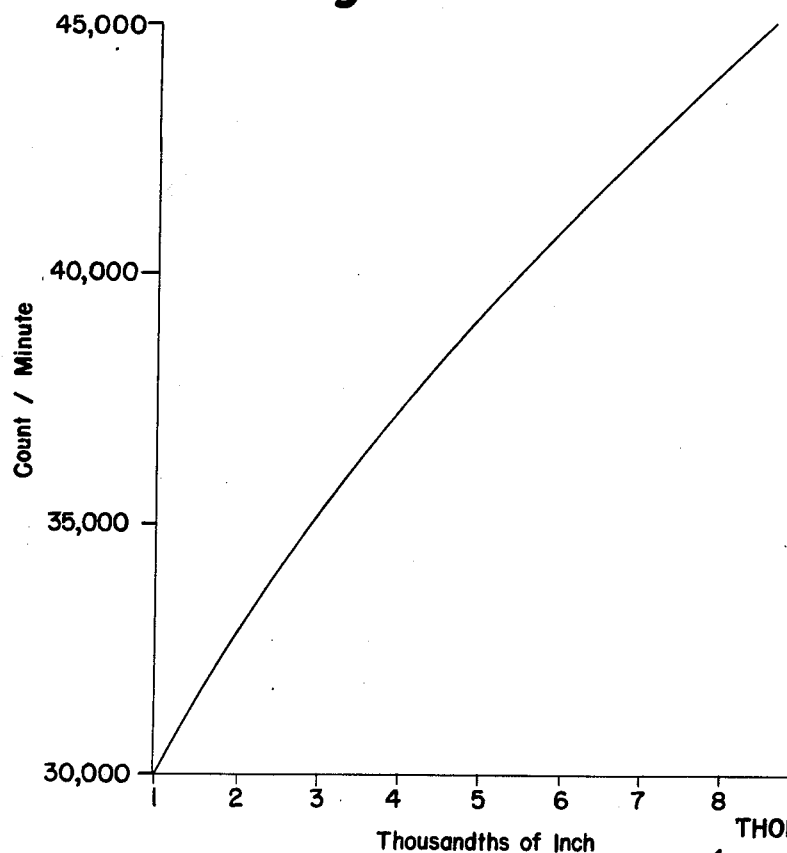
Fig. 4 is a calibration chart with the intensity of radiation in counts per minute as the ordinate, and the thickness of the coating in thousandths of an inch as the abscissa.

Before the thickness gages can be used, there must be prepared a suitable calibration chart such as is illustrated in Fig. 4. To do this, the base is given a coating of known thickness. Cap 18 is removed from window 14, and radiation sensing device 28 is located a distance equal to the amount the legs 38 project beyond window 32 from the coating 34, as seen in Fig. 2. The magnitude of the current flowing through radiation sensing device 28, or the number of pulses, is then noted; and one point of the calibration curve is obtained. By doing the same thing with several different known thicknesses of the coating it is possible to prepare a calibration chart such as is illustrated in Fig. 4. This particular chart is for a lead oxide vinyl paint, formula F119, MILL–P–15929A on a ⅛" thick plate of rolled low carbon steel.

Cap 18, when placed over window 14, prevents any harmful radiation from escaping outside of shield 16. The gage is, therefore, safe enough, as well as light enough, to be carried to wherever it is needed. When the gage is to be used, cap 18 is removed so that the beta radiation may strike the coating to be measured. The sensing device is then brought near the outer surface of the coating, the thickness of which is to be measured at the point where it is desired to make such a measurement. The sensing device 28 is placed a distance equal to the amount legs 38 project beyond window 32 and so that the window is substantially parallel to the outer surface of the coating. The radiation detector 30 is then energized and the magnitude of the current or the number of counts noted. By use of the proper calibration chart the thickness of the coating at that particular point is known. Measurement of the thickness of the coating can be made at as many points as is necessary by moving the sensing device 28 to such points and by repeating the process as described above.

In describing the use of the beta radiation thickness gage it has been indicated that it can be used to measure the thickness of the coating on a base material. It is also possible to use the device to measure the thickness of an outer coating over an inner coating or coatings and a base material when a proper calibration chart is available.

Obviously many modifications and variations of the present invention are possible in the light of the above teachings. It is therefore to be understood that within the scope of the appended claim the invention may be practiced otherwise than as specifically described.

What is claimed is:

A portable device for measuring the thickness of a surface coating comprising a first housing having a windowed opening at its front end and a closed rear end providing a detector chamber, a plurality of spacing legs extending longitudinally along the exterior of said housing having front end portions positioned forwardly of said windowed opening for contacting the surface coating and positioning the windowed opening generally parallel with the surface coating, a friction fit adjusting ring mounted on the rear end portion of said housing and secured to the rear end portions of the spacing legs permitting adjustment of the windowed opening relative to the surface coating when said front end portions of the legs are in contacting relation with the surface coating, a second housing for containing a radiation source, said second housing being constructed of material providing a shield for the radiation source and having a radiation transmission opening, connecting means between the first housing and the second housing, said connecting means including a second adjusting ring mounted on the front end portion of the first housing and an arm extending laterally therefrom, said arm positioning the second housing at an angle to the surface coating in order that radiations transmitted therefrom will be reflected from the coating into the windowed opening of the first housing and means communicating with the detector chamber of the first housing for indicating the intensity of said reflected radiations.

References Cited in the file of this patent

UNITED STATES PATENTS

| Re. 22,531 | Hare | Aug. 22, 1944 |
| 2,428,796 | Friedman | Oct. 14, 1947 |
| 2,486,902 | Wolf | Nov. 1, 1949 |
| 2,723,350 | Clapp | Nov. 8, 1955 |
| 2,769,097 | Lord | Oct. 30, 1956 |
| 2,781,453 | Belcher et al. | Feb. 12, 1957 |

OTHER REFERENCES

Development in Thickness Gauges and Allied Instruments, by Putman, a paper submitted to the Geneva Conference, in August 1955, in Peaceful Uses of Atomic Energy, vol. 15, pages 119 to 123, United Nations, New York, 1956.